(12) United States Patent
Lee et al.

(10) Patent No.: US 11,324,017 B2
(45) Date of Patent: May 3, 2022

(54) METHOD AND APPARATUS FOR TRANSMITTING SIDELINK FEEDBACK INFORMATION IN WIRELESS COMMUNICATION SYSTEM

(71) Applicant: ELECTRONICS AND TELECOMMUNICATIONS RESEARCH INSTITUTE, Daejeon (KR)

(72) Inventors: Jung Hoon Lee, Daejeon (KR); Cheul Soon Kim, Daejeon (KR); Sung Hyun Moon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 49 days.

(21) Appl. No.: 16/902,796

(22) Filed: Jun. 16, 2020

(65) Prior Publication Data

US 2020/0396747 A1 Dec. 17, 2020

(30) Foreign Application Priority Data

Jun. 17, 2019 (KR) .................. 10-2019-0071639
Feb. 27, 2020 (KR) .................. 10-2020-0024579
Jun. 8, 2020 (KR) .................. 10-2020-0068928

(51) Int. Cl.
*H04W 72/10* (2009.01)
*H04W 72/04* (2009.01)
*H04W 72/08* (2009.01)
*H04W 72/02* (2009.01)
*H04W 92/18* (2009.01)

(52) U.S. Cl.
CPC ............ *H04W 72/10* (2013.01); *H04W 72/02* (2013.01); *H04W 72/0473* (2013.01); *H04W 72/08* (2013.01); *H04W 92/18* (2013.01)

(58) Field of Classification Search
CPC ................ H04L 1/1854; H04W 72/02; H04W 72/0473; H04W 72/08; H04W 72/10; H04W 92/18
See application file for complete search history.

(56) References Cited

U.S. PATENT DOCUMENTS

| | | | |
|---|---|---|---|
| 2016/0128066 A1 | 5/2016 | Park et al. | |
| 2018/0234980 A1* | 8/2018 | Li | H04W 72/10 |
| 2019/0052436 A1 | 2/2019 | Desai et al. | |
| 2019/0281603 A1 | 9/2019 | Oh et al. | |

(Continued)

FOREIGN PATENT DOCUMENTS

| | | | |
|---|---|---|---|
| WO | 2017078783 A1 | 5/2017 |
| WO | 2018169327 A1 | 9/2018 |

(Continued)

*Primary Examiner* — Kashif Siddiqui
(74) *Attorney, Agent, or Firm* — Rabin & Berdo, P.C.

(57) ABSTRACT

An operation method of a first terminal performing sidelink communication may comprise receiving a first sidelink signal from a second terminal; transmitting a second sidelink signal to a third terminal; comparing feedback priorities for the first sidelink signal and the second sidelink signal in a specific period; and based on a result of comparing the feedback priorities, transmitting or receiving one sidelink feedback signal among a sidelink feedback signal for the first sidelink signal and a sidelink feedback signal for the second sidelink signal in the specific period.

20 Claims, 12 Drawing Sheets

(56) References Cited

U.S. PATENT DOCUMENTS

| | | |
|---|---|---|
| 2020/0127793 A1 | 4/2020 | Kim et al. |
| 2020/0163155 A1 | 5/2020 | Lee et al. |
| 2021/0345360 A1* | 11/2021 | Yeo .................. H04W 72/02 |
| 2021/0385821 A1* | 12/2021 | Yeo .................. H04W 72/087 |

FOREIGN PATENT DOCUMENTS

| | | |
|---|---|---|
| WO | 2018203669 A1 | 11/2018 |
| WO | 2019029375 A1 | 2/2019 |
| WO | 2019075238 A1 | 4/2019 |

\* cited by examiner

400

RMSI CORESET mapping pattern #1

RMSI CORESET mapping pattern #2

RMSI CORESET mapping pattern #3

METHOD AND APPARATUS FOR TRANSMITTING SIDELINK FEEDBACK INFORMATION IN WIRELESS COMMUNICATION SYSTEM

CROSS-REFERENCE TO RELATED APPLICATIONS

This application claims priority to Korean Patent Applications No. 10-2019-0071639 filed on Jun. 17, 2019, No. 10-2020-0024579 filed on Feb. 27, 2020, and No. 10-2020-0068928 filed on Jun. 8, 2020 with the Korean Intellectual Property Office (KIPO), the entire contents of which are hereby incorporated by reference.

BACKGROUND

1. Technical Field

The present disclosure relates generally to methods for transmitting and receiving feedback information in a communication system, and more specifically, to methods for transmitting and receiving feedback information for sidelink data.

2. Related Art

The communication system (hereinafter, a new radio (NR) communication system) using a higher frequency band (e.g., a frequency band of 6 GHz or higher) than a frequency band (e.g., a frequency band lower below 6 GHz) of the long term evolution (LTE) (or, LTE-A) is being considered for processing of soaring wireless data. The NR communication system may support not only a frequency band below 6 GHz but also 6 GHz or higher frequency band, and may support various communication services and scenarios as compared to the LTE communication system. In addition, requirements of the NR communication system may include enhanced mobile broadband (eMBB), ultra-reliable low-latency communication (URLLC), massive machine type communication (mMTC), and the like.

Sidelink communication may be performed in the NR system. In order to improve the performance of sidelink communication, transmission of feedback information (e.g., acknowledgment (ACK) or negative ACK (HACK)) for sidelink data may be performed. For example, a first terminal may transmit data to a second terminal, and the second terminal may transmit feedback information for the data to the first terminal. Meanwhile, the sidelink communication may be performed based on a unicast scheme as well as a broadcast scheme or a groupcast scheme. When the sidelink communication is performed based on the broadcast scheme or the groupcast scheme, a procedure for transmitting feedback information therefor is required.

SUMMARY

Accordingly, exemplary embodiments of the present disclosure provide methods and apparatuses for determining whether to transmit sidelink feedback information based on a priority of sidelink data in a sidelink communication system.

Accordingly, exemplary embodiments of the present disclosure also provide methods and apparatuses for preferentially transmitting sidelink feedback information having high importance by allocating a transmit power to the sidelink feedback information based on a priority of the sidelink feedback information in a sidelink communication system.

An operation method of a first terminal performing sidelink communication may comprise: receiving a first sidelink signal from a second terminal; transmitting a second sidelink signal to a third terminal; comparing feedback priorities for the first sidelink signal and the second sidelink signal in a specific period; and based on a result of comparing the feedback priorities, transmitting or receiving one sidelink feedback signal among a sidelink feedback signal for the first sidelink signal and a sidelink feedback signal for the second sidelink signal in the specific period.

The specific period may be a physical sidelink feedback channel (PSFCH) transmission occasion which is configured periodically.

In the transmitting or receiving of the one sidelink feedback signal, the sidelink feedback signal for the first sidelink signal may be transmitted in the specific period when a priority of sidelink data included in the first sidelink signal is higher than a priority of sidelink data included in the second sidelink signal, and the sidelink feedback signal for the second sidelink signal may be received in the specific period when the priority of sidelink data included in the second sidelink signal is higher than the priority of sidelink data included in the first sidelink signal.

The feedback priority may be determined based on at least one of importance, quality of service (QoS), and size of sidelink data included in each of the first sidelink signal and the second sidelink signal.

When sidelink data is not obtained from the second sidelink signal, the feedback priority for the first sidelink signal may be determined to be higher than the feedback priority for the second sidelink signal.

In the comparing of the feedback priorities, a highest priority of priorities of one or more sidelink data units included in the first sidelink signal may be compared with a highest priority of priorities of one or more sidelink data units included in the second sidelink signal.

When the highest priority of priorities of one or more sidelink data units included in the first sidelink signal is equal to the highest priority of priorities of one or more sidelink data units included in the second sidelink signal, a second highest priority of priorities of one or more sidelink data units included in the first sidelink signal may be compared with a second highest priority of priorities of one or more sidelink data units included in the second sidelink signal.

An operation method of a first terminal performing sidelink communication may comprise: receiving a plurality of sidelink data units; comparing feedback priorities for the plurality of sidelink data units in a specific period; and based on a result of comparing the feedback priorities, transmitting a sidelink feedback signal including feedback information for one or more sidelink data units among the plurality of sidelink data units in the specific period.

When a first sidelink data unit is received and a second sidelink data unit is not obtained among the plurality of sidelink data units, the feedback priority of the first sidelink data unit may be determined to be higher than the feedback priority of the second sidelink data unit.

The transmitting of the sidelink feedback signal may further comprise allocating a transmit power to feedback information for each of the plurality of sidelink data units based on the feedback priority of each of the plurality of sidelink data units.

The operation method may further comprise, when a transmit power of at least one feedback information for the plurality of sidelink data units is equal to or less than a preconfigured value, dropping transmission of the at least one feedback information.

The operation method may further comprise determining a preconfigured number of feedback information among feedback information for the plurality of sidelink data units, wherein when a sum of transmit powers of the preconfigured number of feedback information is larger than a maximum transmit power of the first terminal, in the transmitting of the sidelink feedback signal, a signal including at least a portion of the preconfigured number of feedback information is transmitted, and a sum of transmit powers of the at least the portion of the preconfigured number of feedback information is smaller than the maximum transmit power of the first terminal.

A first terminal performing sidelink communication may comprise a processor; a memory electronically communication with the processor; and instructions stored in the memory, wherein when the instructions are executed by the processor, the instructions causes the first terminal to: receive a first sidelink signal from a second terminal; transmit a second sidelink signal to a third terminal; compare feedback priorities for the first sidelink signal and the second sidelink signal in a specific period; and based on a result of comparing the feedback priorities, transmit or receive one sidelink feedback signal among a sidelink feedback signal for the first sidelink signal and a sidelink feedback signal for the second sidelink signal in the specific period.

The specific period may be a physical sidelink feedback channel (PSFCH) transmission occasion which is configured periodically.

In the transmitting or receiving of the one sidelink feedback signal, the sidelink feedback signal for the first sidelink signal may be transmitted in the specific period when a priority of sidelink data included in the first sidelink signal is higher than a priority of sidelink data included in the second sidelink signal, and the sidelink feedback signal for the second sidelink signal may be received in the specific period when the priority of sidelink data included in the second sidelink signal is higher than the priority of sidelink data included in the first sidelink signal.

The feedback priority may be determined based on at least one of importance, quality of service (QoS), and size of sidelink data included in each of the first sidelink signal and the second sidelink signal.

When sidelink data is not obtained from the second sidelink signal, the feedback priority for the first sidelink signal may be determined to be higher than the feedback priority for the second sidelink signal.

When the first sidelink signal includes a plurality of sidelink data units, the instructions may further cause the first terminal to compare feedback priorities of the plurality of sidelink data units in the specific period.

When the second sidelink signal includes a plurality of sidelink data units, the instructions may further cause the first terminal to compare a highest priority of priorities of the plurality of sidelink data units included in the first sidelink signal with a highest priority of priorities of a plurality of sidelink data units included in the second sidelink signal.

The instructions may further cause the first terminal to allocate a transmit power to feedback information for each of the plurality of sidelink data units based on the feedback priority of each of the plurality of sidelink data units, and to drop transmission of at least one feedback information to which a transmit power equal to or less than a preconfigured value is applied among the feedback information for the plurality of sidelink data units.

According to the exemplary embodiments of the present disclosure, when a transmission timing and a reception timing of sidelink feedback information collide, the communication node can determine whether to transmit or receive sidelink feedback information based on priorities of sidelink data, thereby improving the transmission and reception performance of the sidelink feedback information. In addition, according to the exemplary embodiments of the present disclosure, when simultaneously transmitting a plurality of sidelink feedback information at the same time, the communication node can allocate a transmit power to the sidelink feedback information based on priorities of the sidelink feedback information, thereby preferentially transmitting the sidelink feedback information of high importance.

Therefore, feedback information of a plurality of terminals can be efficiently transmitted in sidelink groupcast communication. Accordingly, the performance of the communication system can be improved.

DETAILED DESCRIPTION OF THE EMBODIMENTS

Figure 1:
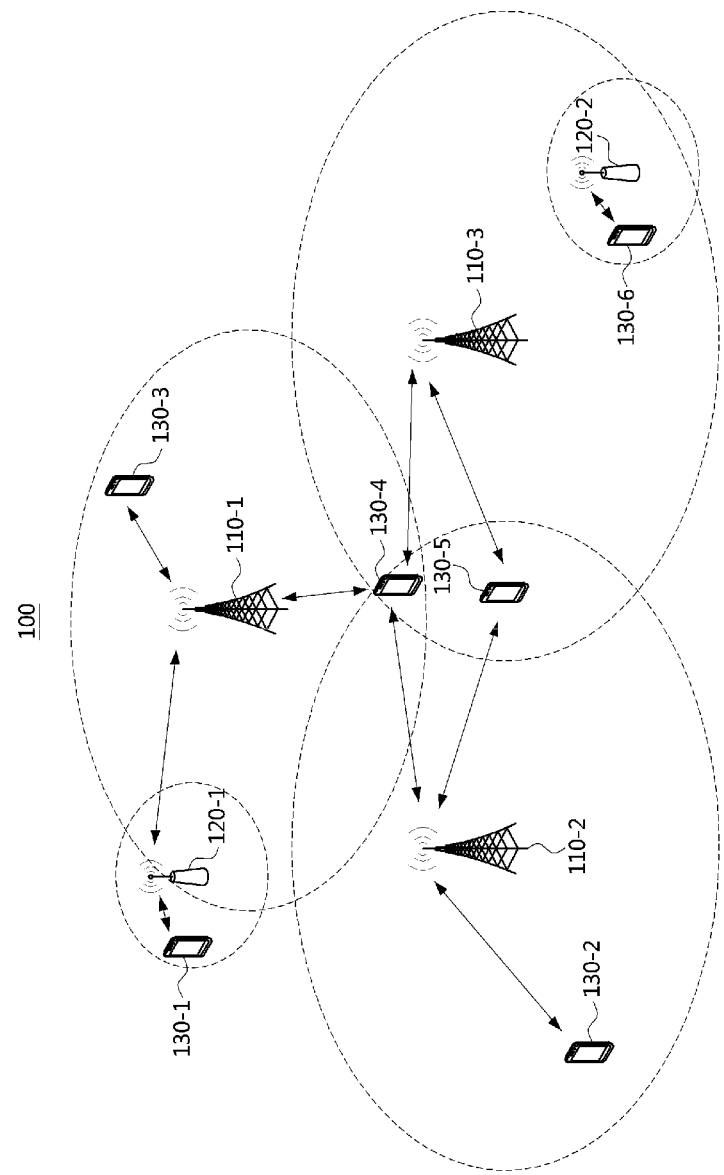
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. However, the communication systems to which exemplary embodiments according to the present disclosure are applied are not restricted to what will be described below. That is, the exemplary embodiments according to the present disclosure may be applied to various communication systems. Here, the term 'communication system' may be used in the same sense as the term 'communication network'.

FIG. 1 is a conceptual diagram illustrating a first exemplary embodiment of a communication system.

As shown in FIG. 1, a communication system 100 may comprise a plurality of communication nodes 110-1, 110-2, 110-3, 120-1, 120-2, 130-1, 130-2, 130-3, 130-4, 130-5, and 130-6. Also, the communication system 100 may further comprise a core network (e.g., a serving gateway (S-GW), a packet data network (PDN) gateway (P-GW), and a mobility management entity (MME)). When the communication system 100 is a 5G communication system (e.g., new radio (NR) system), the core network may include an access and mobility management function (AMF), a user plane function (UPF), a session management function (SMF), and the like.

The plurality of communication nodes 110 to 130 may support a communication protocol defined by the 3rd generation partnership project (3GPP) specifications (e.g., LTE communication protocol, LTE-A communication protocol, NR communication protocol, or the like). The plurality of communication nodes 110 to 130 may support code division multiple access (CDMA) technology, wideband CDMA (WCDMA) technology, time division multiple access (TDMA) technology, frequency division multiple access (FDMA) technology, orthogonal frequency division multiplexing (OFDM) technology, filtered OFDM technology, cyclic prefix OFDM (CP-OFDM) technology, discrete Fourier transform-spread-OFDM (DFT-s-OFDM) technology, orthogonal frequency division multiple access (OFDMA) technology, single carrier FDMA (SC-FDMA) technology, non-orthogonal multiple access (NOMA) technology, generalized frequency division multiplexing (GFDM) technology, filter band multi-carrier (FBMC) technology, universal filtered multi-carrier (UFMC) technology, space division multiple access (SDMA) technology, or the like. Each of the plurality of communication nodes may have the following structure.

Figure 2:
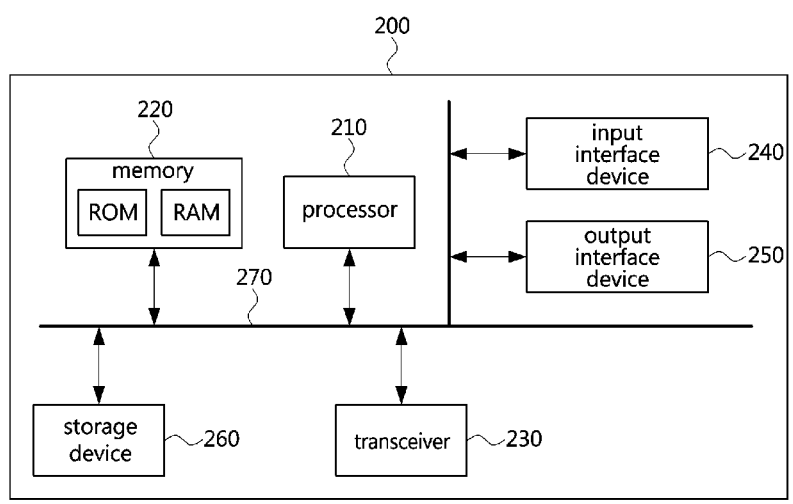
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may not be connected to the common bus 270 but may be connected to the processor 210 via an individual interface or a separate bus. For example, the processor 210 may be connected to at least one of the memory 220, the transceiver 230, the input interface device 240, the output interface device 250 and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B (NB), a evolved Node-B (eNB), a gNB, an advanced base station (ABS), a high reliability-base station (HR-BS), a base transceiver station (BTS), a radio base station, a radio transceiver, an access point, an access node, a radio access station (RAS), a mobile multihop relay-base station (MMR-BS), a relay station (RS), an advanced relay station (ARS), a high reliability-relay station (HR-RS), a home NodeB (HNB), a home eNodeB (HeNB), a road side unit (RSU), a radio remote head (RRH), a transmission point (TP), a transmission and reception point (TRP), or the like.

Each of the plurality of terminals 130-1, 130-2, 130-3, 130-4, 130-5, and 130-6 may refer to a user equipment (UE), a terminal equipment (TE), an advanced mobile station (AMS), a high reliability-mobile station (HR-MS), a terminal, an access terminal, a mobile terminal, a station, a subscriber station, a mobile station, a portable subscriber station, a node, a device, an on-board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, a device-to-device (D2D) communications (or, proximity services (ProSe)), or the like.

Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Meanwhile, the communication system may support three types of frame structures. A type 1 frame structure may be applied to a frequency division duplex (FDD) communication system, a type 2 frame structure may be applied to a time division duplex (TDD) communication system, and a type 3 frame structure may be applied to an unlicensed band based communication system (e.g., a licensed assisted access (LAA) communication system).

Figure 3:
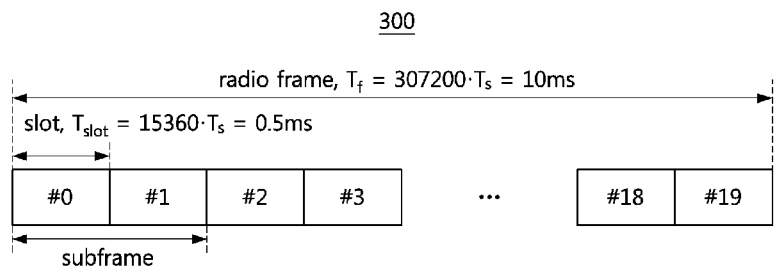
FIG. 3 is a conceptual diagram illustrating an embodiment of a type 1 frame.

FIG. 3 is a conceptual diagram illustrating an embodiment of a type 1 frame.

Referring to FIG. 3, a radio frame 300 may comprise 10 subframes, and a subframe may comprise 2 slots. Thus, the radio frame 300 may comprise 20 slots (e.g., slot #0, slot #1, slot #2, slot #3, . . . , slot #18, and slot #19). The length ($T_f$) of the radio frame 300 may be 10 milliseconds (ms). The length of the subframe may be 1 ms, and the length ($T_{slot}$) of a slot may be 0.5 ms. Here, $T_s$ may indicate a sampling time, and may be 1/30,720,000 s.

The slot may be composed of a plurality of OFDM symbols in the time domain, and may be composed of a plurality of resource blocks (RBs) in the frequency domain. The RB may be composed of a plurality of subcarriers in the frequency domain. The number of OFDM symbols constituting the slot may vary depending on configuration of a cyclic prefix (CP). The CP may be classified into a normal CP and an extended CP. If the normal CP is used, the slot may be composed of 7 OFDM symbols, in which case the subframe may be composed of 14 OFDM symbols. If the extended CP is used, the slot may be composed of 6 OFDM symbols, in which case the subframe may be composed of 12 OFDM symbols.

Figure 4:
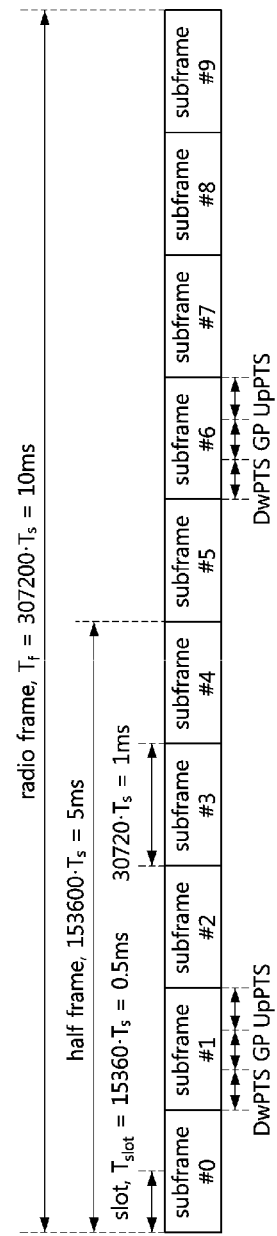
FIG. 4 is a conceptual diagram illustrating an embodiment of a type 2 frame.

FIG. 4 is a conceptual diagram illustrating an embodiment of a type 2 frame.

Referring to FIG. 4, a radio frame 400 may comprise two half frames, and a half frame may comprise 5 subframes. Thus, the radio frame 400 may comprise 10 subframes. The length ($T_f$) of the radio frame 400 may be 10 ms. The length of the half frame may be 5 ms. The length of the subframe may be 1 ms. Here, $T_s$ may be 1/30,720,000 s.

The radio frame 400 may include at least one downlink subframe, at least one uplink subframe, and a least one special subframe. Each of the downlink subframe and the uplink subframe may include two slots. The length ($T_{slot}$) of a slot may be 0.5 ms. Among the subframes included in the radio frame 400, each of the subframe #1 and the subframe #6 may be a special subframe. For example, when a switching periodicity between downlink and uplink is 5 ms, the radio frame 400 may include 2 special subframes. Alternatively, the switching periodicity between downlink and uplink is 10 ms, the radio frame 400 may include one special subframe. The special subframe may include a downlink pilot time slot (DwPTS), a guard period (GP), and an uplink pilot time slot (UpPTS).

The downlink pilot time slot may be regarded as a downlink interval and may be used for cell search, time and frequency synchronization acquisition of the terminal, channel estimation, and the like. The guard period may be used for resolving interference problems of uplink data transmission caused by delay of downlink data reception. Also, the guard period may include a time required for switching from the downlink data reception operation to the uplink data transmission operation. The uplink pilot time slot may be used for uplink channel estimation, time and frequency synchronization acquisition, and the like. Transmission of a physical random access channel (PRACH) or a sounding reference signal (SRS) may be performed in the uplink pilot time slot.

The lengths of the downlink pilot time slot, the guard period, and the uplink pilot time slot included in the special subframe may be variably adjusted as needed. In addition, the number and position of each of the downlink subframe, the uplink subframe, and the special subframe included in the radio frame 400 may be changed as needed.

Figure 5:
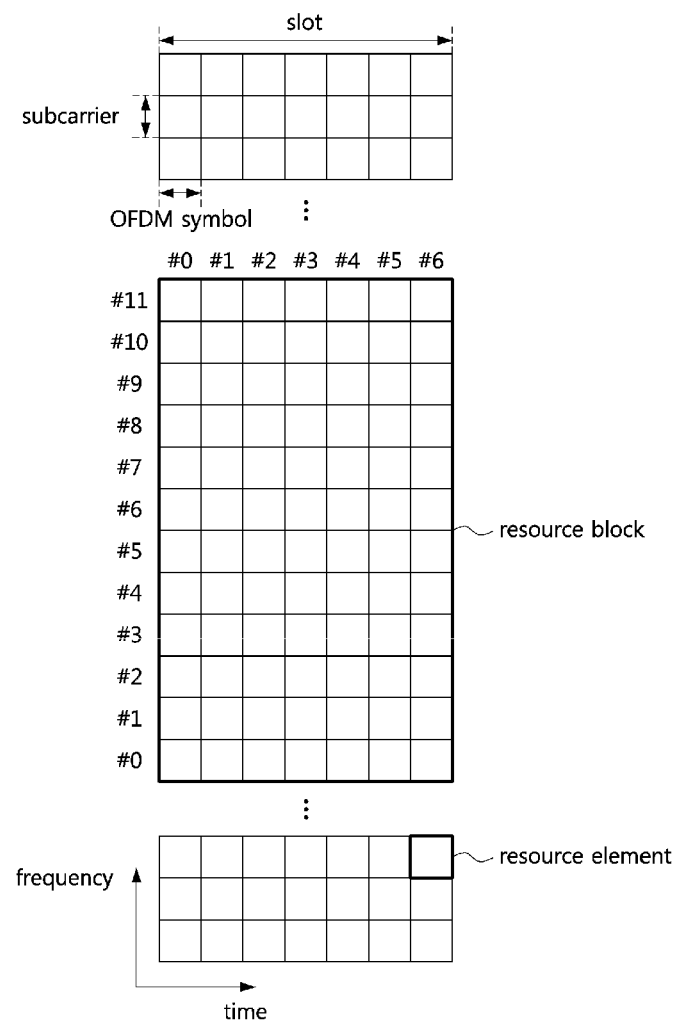
FIG. 5 is a conceptual diagram illustrating a first exemplary embodiment of a resource grid of a slot included in a subframe.

FIG. 5 is a conceptual diagram illustrating a first exemplary embodiment of a resource grid of a slot included in a subframe.

Referring to FIG. 5, a resource block of a slot included in a downlink subframe or an uplink subframe may be composed of 7 OFDM symbols in the time domain when a normal CP is used, and 12 subcarriers in the frequency domain. Each of the 7 OFDM symbols may be referred to as symbol #0, symbol #1, symbol #2, symbol #3, symbol #4, symbol #5, symbol #6, and symbol #7. Each of the 12 subcarriers may be referred to as subcarrier #0, subcarrier #1, subcarrier #2, subcarrier #3, subcarrier #4, subcarrier #5, subcarrier #6, subcarrier #7, subcarrier #8, subcarrier #9, subcarrier #10, and subcarrier #11. In this case, a resource constituted by one OFDM symbol in the time domain and one subcarrier in the frequency domain may be referred to as a 'resource element (RE)'.

Hereinafter, methods for transmitting and receiving hybrid automatic repeat request (HARQ) feedback information in a communication system will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a terminal is described, a corresponding base station may perform an operation corresponding to the operation of the terminal. Conversely, when an operation of the base station is described, the corresponding terminal may perform an operation corresponding to the operation of the base station.

In the communication system, a transmission time interval (TTI) may be a basic time unit for transmitting coded data through a physical layer. A short TTI may be used to support low latency requirements in the communication system. The length of the short TTI may be less than 1 ms. The conventional TTI having a length of 1 ms may be referred to as a base TTI or a regular TTI. That is, the base TTI may be composed of one subframe. In order to support transmission on a base TTI basis, signals and channels may be configured on a subframe basis. For example, a cell-specific reference signal (CRS), a physical downlink control channel (PDCCH), a physical downlink shared channel (PDSCH), a physical uplink control channel (PUCCH), a physical uplink shared channel (PUSCH), and the like may exist in each subframe.

On the other hand, a synchronization signal (e.g., a primary synchronization signal (PSS) and a secondary synchronization signal (SSS)) may exist for every 5 subframes, and a physical broadcast channel (PBCH) may exist for every 10 subframes. Also, each radio frame may be identified by an SFN, and the SFN may be used for defining transmission of a signal (e.g., a paging signal, a reference signal for channel estimation, a signal for channel state information, etc.) longer than one radio frame. The periodicity of the SFN may be 1024.

In the LTE system, the PBCH may be a physical layer channel used for transmission of system information (e.g., master information block (MIB)). The PBCH may be transmitted every 10 subframes. That is, the transmission periodicity of the PBCH may be 10 ms, and the PBCH may be transmitted once in the radio frame. The same MIB may be transmitted during 4 consecutive radio frames, and after 4 consecutive radio frames, the MIB may be changed according to a situation of the LTE system. The transmission period for which the same MIB is transmitted may be referred to as a 'PBCH TTI', and the PBCH TTI may be 40 ms. That is, the MIB may be changed for each PBCH TTI.

The MIB may be composed of 40 bits. Among the 40 bits constituting the MIB, 3 bits may be used to indicate a system band, 3 bits may be used to indicate physical hybrid automatic repeat request (ARQ) indicator channel (PHICH) related information, 8 bits may be used to indicate an SFN, 10 bits may be configured as reserved bits, and 16 bits may be used for a cyclic redundancy check (CRC).

The SFN for identifying the radio frame may be composed of a total of 10 bits (B9 to B0), and the most significant bits (MSBs) 8 bits (B9 to B2) among the 10 bits may be indicated by the PBCH (i.e., MIB). The MSBs 8 bits (B9 to B2) of the SFN indicated by the PBCH (i.e., MIB) may be identical during 4 consecutive radio frames (i.e., PBCH TTI). The least significant bits (LSBs) 2 bits (B1 to B0) of the SFN may be changed during 4 consecutive radio frames (i.e., PBCH TTI), and may not be explicitly indicated by the PBCH (i.e., MIB). The LSBs (2 bits (B1 to B0)) of the SFN may be implicitly indicated by a scrambling sequence of the PBCH (hereinafter referred to as 'PBCH scrambling sequence').

A Gold sequence generated by being initialized by a cell ID may be used as the PBCH scrambling sequence, and the PBCH scrambling sequence may be initialized for each four consecutive radio frames (e.g., each PBCH TTI) based on an operation of 'mod (SFN, 4)'. The PBCH transmitted in a radio frame corresponding to an SFN with LSBs 2 bits (B1 to B0) set to '00' may be scrambled by the Gold sequence generated by being initialized by the cell ID. Thereafter, the Gold sequences generated according to the operation of 'mod (SFN, 4)' may be used to scramble the PBCH transmitted in the radio frames corresponding to SFNs with LSBs 2 bits (B1 to B0) set to '01', '10', and '11'.

Accordingly, the terminal having acquired the cell ID in the initial cell search process may identify the value of the LSBs 2 bits (B1 to B0) of the SFN (e.g., '00', '01', '10', or '11') based on the PBCH scramble sequence obtained in the decoding process for the PBCH (i.e., MIB). The terminal may use the LSBs 2 bits (B1 to B0) of the SFN obtained based on the PBCH scrambling sequence and the MSBs 8 bits (B9 to B2) of the SFN indicated by the PBCH (i.e., MIB) so as to identify the SFN (i.e., the entire bits B9 to B0 of the SFN).

On the other hand, the communication system may support not only a high transmission rate but also technical requirements for various service scenarios. For example, the communication system may support an enhanced mobile broadband (eMBB) service, an ultra-reliable low-latency communication (URLLC) service, a massive machine type communication (mMTC) service, and the like.

The subcarrier spacing of the communication system (e.g., OFDM-based communication system) may be determined based on a carrier frequency offset (CFO) and the like. The CFO may be generated by a Doppler effect, a phase drift, or the like, and may increase in proportion to an operation frequency. Therefore, in order to prevent the performance degradation of the communication system due to the CFO, the subcarrier spacing may increase in proportion to the operation frequency. On the other hand, as the subcarrier spacing increases, a CP overhead may increase. Therefore, the subcarrier spacing may be configured based on a channel characteristic, a radio frequency (RF) characteristic, etc. according to a frequency band.

The communication system may support numerologies defined in Table 1 below.

TABLE 1

| μ | Subcarrier spacing ($\Delta f = 2^\mu \cdot 15$ kHz) | cyclic prefix (CP) type |
|---|---|---|
| 0 | 15 kHz | Normal |
| 1 | 30 kHz | Normal |
| 2 | 60 kHz | Normal, extended |
| 3 | 120 kHz | Normal |
| 4 | 240 kHz | Normal |
| 5 | 480 kHz | Normal |

For example, the subcarrier spacing of the communication system may be set to 15 kHz, 30 kHz, 60 kHz, or 120 kHz. The subcarrier spacing of the LTE system may be 15 kHz, and the subcarrier spacing of the NR system may be 1, 2, 4, or 8 times the conventional subcarrier spacing of 15 kHz. If the subcarrier spacing increases by exponentiation units of 2 of the conventional subcarrier spacing, the frame structure can be easily designed.

The communication system may support a wide frequency band (e.g., several hundred MHz to tens of GHz). Since the diffraction characteristic and the reflection characteristic of the radio wave are poor in a high frequency band, a propagation loss (e.g., path loss, reflection loss, and the like) in a high frequency band may be larger than a propagation loss in a low frequency band. Therefore, a cell coverage of a communication system supporting a high frequency band may be smaller than a cell coverage of a communication system supporting a low frequency band. In order to solve such the problem, a beamforming scheme based on a plurality of antenna elements may be used to increase the cell coverage in the communication system supporting a high frequency band.

The beamforming scheme may include a digital beamforming scheme, an analog beamforming scheme, a hybrid beamforming scheme, and the like. In the communication system using the digital beamforming scheme, a beamforming gain may be obtained using a plurality of RF paths based on a digital precoder or a codebook. In the communication system using the analog beamforming scheme, a beamforming gain may be obtained using analog RF devices (e.g., phase shifter, power amplifier (PA), variable gain amplifier (VGA), and the like) and an antenna array.

Because of the need for expensive digital to analog converters (DACs) or analog to digital converters (ADCs) for digital beamforming schemes and transceiver units corresponding to the number of antenna elements, the complexity of antenna implementation may be increased to increase the beamforming gain. In case of the communication system using the analog beamforming scheme, since a plurality of antenna elements are connected to one transceiver unit through phase shifters, the complexity of the antenna implementation may not increase greatly even if the beamforming gain is increased. However, the beamforming performance of the communication system using the analog beamforming scheme may be lower than the beamforming performance of the communication system using the digital beamforming scheme. Further, in the communication system using the analog beamforming scheme, since the phase shifter is adjusted in the time domain, frequency resources may not be efficiently used. Therefore, a hybrid beam forming scheme, which is a combination of the digital scheme and the analog scheme, may be used.

When the cell coverage is increased by the use of the beamforming scheme, common control channels and common signals (e.g., reference signal and synchronization signal) for all terminals belonging to the cell coverage as well as control channels and data channels for each terminal may also be transmitted based on the beamforming scheme. In this case, the common control channels and the common signals for all terminals belonging to the cell coverage may be transmitted based on a beam sweeping scheme.

Also, in the NR system, a synchronization signal/physical broadcast channel (SS/PBCH) block may also be transmitted in a beam sweeping scheme. The SS/PBCH block may be composed of a PSS, an SSS, a PBCH, and the like. In the SS/PBCH block, the PSS, the SSS, and the PBCH may be configured in a time division multiplexing (TDM) manner. The SS/PBCH block may be referred also to as an 'SS block (SSB)'. One SS/PBCH block may be transmitted using N consecutive OFDM symbols. Here, N may be an integer equal to or greater than 4. The base station may periodically transmit the SS/PBCH block, and the terminal may acquire frequency/time synchronization, a cell ID, system information, and the like based on the SS/PBCH block received from the base station. The SS/PBCH block may be transmitted as follows.

Figure 6:
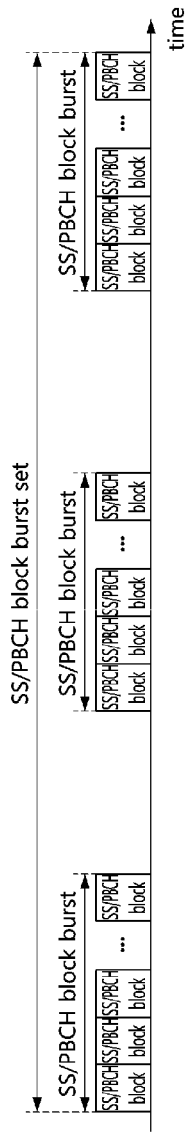
FIG. 6 is a conceptual diagram illustrating a first exemplary embodiment of a transmission method of SS/PBCH block in a communication system.

FIG. 6 is a conceptual diagram illustrating a first exemplary embodiment of a transmission method of SS/PBCH block in a communication system.

As shown in FIG. 6, one or more SS/PBCH blocks may be transmitted in a beam sweeping scheme within an SS/PBCH block burst set. Up to L SS/PBCH blocks may be transmitted within one SS/PBCH block burst set. L may be an integer equal to or greater than 2, and may be defined in the 3GPP standard. Depending on a region of a system frequency, L may vary. Within the SS/PBCH block burst set, the SS/PBCH blocks may be located consecutively or distributively. The consecutive SS/PBCH blocks may be referred to as an 'SS/PBCH block burst'. The SS/PBCH block burst set may be repeated periodically, and system information (e.g., MIB) transmitted through the PBCHs of the SS/PBCH blocks within the SS/PBCH block burst set may be the same. An index of the SS/PBCH block, an index of the SS/PBCH block burst, an index of an OFDM symbol, an index of a slot, and the like may be indicated explicitly or implicitly by the PBCH.

Figure 7:
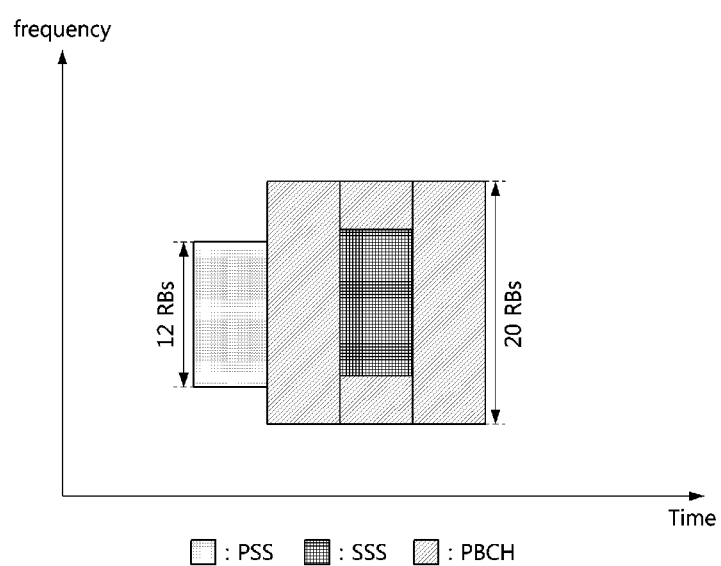
FIG. 7 is a conceptual diagram illustrating a first exemplary embodiment of an SS/PBCH block in a communication system.

FIG. 7 is a conceptual diagram illustrating a first exemplary embodiment of an SS/PBCH block in a communication system.

As shown in FIG. 7, signals and a channel are arranged within one SS/PBCH block in the order of 'PSS→PBCH→SSS→PBCH'. The PSS, SSS, and PBCH within the SS/PBCH block may be configured in a TDM scheme. In a symbol where the SSS is located, the PBCH may be located in frequency resources above the SSS and frequency resources below the SSS. That is, the PBCH may be transmitted in both end bands adjacent to the frequency band in which the SSS is transmitted. When the maximum number L of SS/PBCH blocks is 8 in the sub 6 GHz frequency band, an SS/PBCH block index may be identified based on a demodulation reference signal used for demodulating the PBCH (hereinafter, referred to as 'PBCH DMRS'). When the maximum number L of SSBs is 64 in the over 6 GHz frequency band, LSB 3 bits of 6 bits representing the SS/PBCH block index may be identified based on the PBCH DMRS, and the remaining MSB 3 bits may be identified based on a payload of the PBCH.

The maximum system bandwidth that can be supported in the NR system may be 400 MHz. The size of the maximum bandwidth that can be supported by the terminal may vary depending on the capability of the terminal. Therefore, the terminal may perform an initial access procedure (e.g., initial connection procedure) by using some of the system bandwidth of the NR system supporting a wide band. In order to support access procedures of terminals supporting various sizes of bandwidths, SS/PBCH blocks may be multiplexed in the frequency domain within the system bandwidth of the NR system supporting a wide band. In this case, the SS/PBCH blocks may be transmitted as follows.

Figure 8:
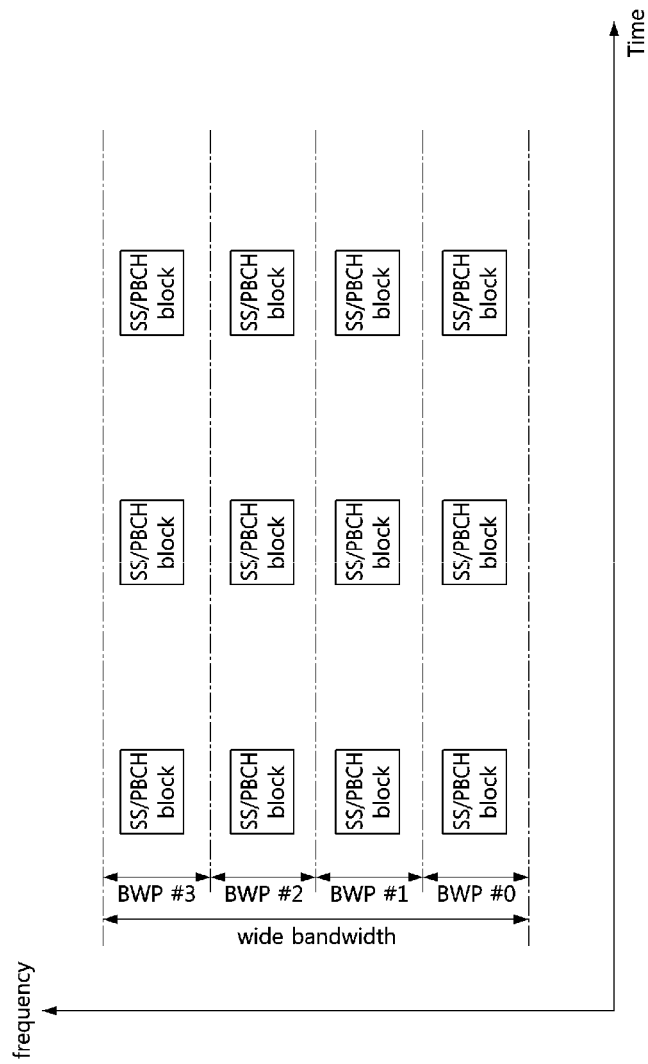
FIG. 8 is a conceptual diagram illustrating a second exemplary embodiment of a method of transmitting SS/PBCH blocks in a communication system.

FIG. 8 is a conceptual diagram illustrating a second exemplary embodiment of a method of transmitting SS/PBCH blocks in a communication system.

As shown in FIG. 8, a wideband component carrier (CC) may include a plurality of bandwidth parts (BWPs). For example, the wideband CC may include 4 BWPs. The base station may transmit SS/PBCH blocks in the respective BWPs #0 to #3 belonging to the wideband CC. The terminal may receive the SS/PBCH block(s) from one or more BWPs of the BWPs #0 to #3, and may perform an initial access procedure using the received SS/PBCH block.

After detecting the SS/PBCH block, the terminal may acquire system information (e.g., remaining minimum system information (RMSI)), and may perform a cell access procedure based on the system information. The RMSI may be transmitted on a PDSCH scheduled by a PDCCH. Configuration information of a control resource set (CORESET) in which the PDCCH including scheduling information of the PDSCH through which the RMSI is transmitted may be transmitted on a PBCH within the SS/PBCH block. A plurality of SS/PBCH blocks may be transmitted in the entire system band, and one or more SS/PBCH blocks among the plurality of SS/PBCH blocks may be SS/PBCH block(s) associated with the RMSI. The remaining SS/PBCH blocks may not be associated with the RMSI. The SS/PBCH block associated with the RMSI may be defined as a 'cell defining SS/PBCH block'. The terminal may perform a cell search procedure and an initial access procedure by using the cell-defining SS/PBCH block. The SS/PBCH block not associated with the RMSI may be used for a synchronization procedure and/or a measurement procedure in the corresponding BWP. The BWP(s) through which the SS/PBCH block is transmitted may be limited to one or more BWPs within a wide bandwidth.

The RMSI may be obtained by performing an operation to obtain configuration information of a CORESET from the SS/PBCH block (e.g., PBCH), an operation of detecting a PDCCH based on the configuration information of the CORESET, an operation to obtain scheduling information of a PDSCH from the PDCCH, and an operation to receive the RMSI through the PDSCH. A transmission resource of the PDCCH may be configured by the configuration information of the CORESET. A mapping patter of the RMSI CORESET pattern may be defined as follows. The RMSI CORESET may be a CORESET used for transmission and reception of the RMSI.

Figure 9A:
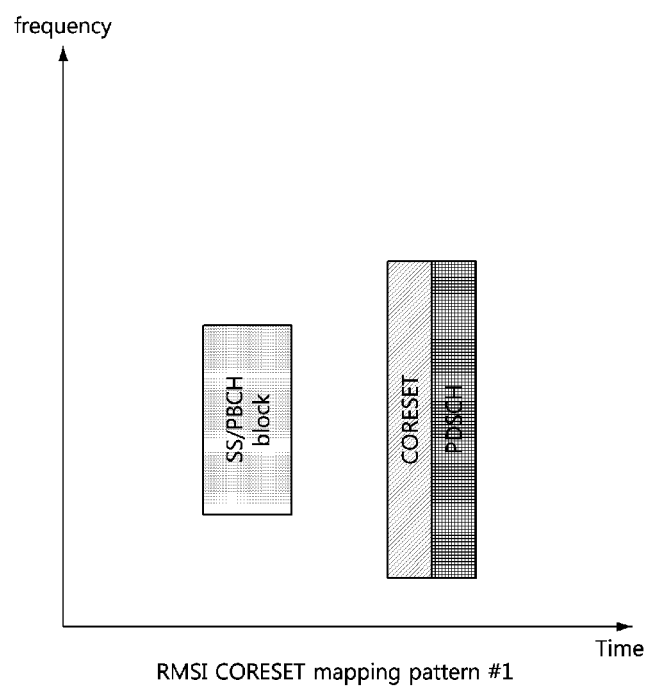
FIG. 9A is a conceptual diagram illustrating an RMSI CORESET mapping pattern #1 in a communication system.
Figure 9B:
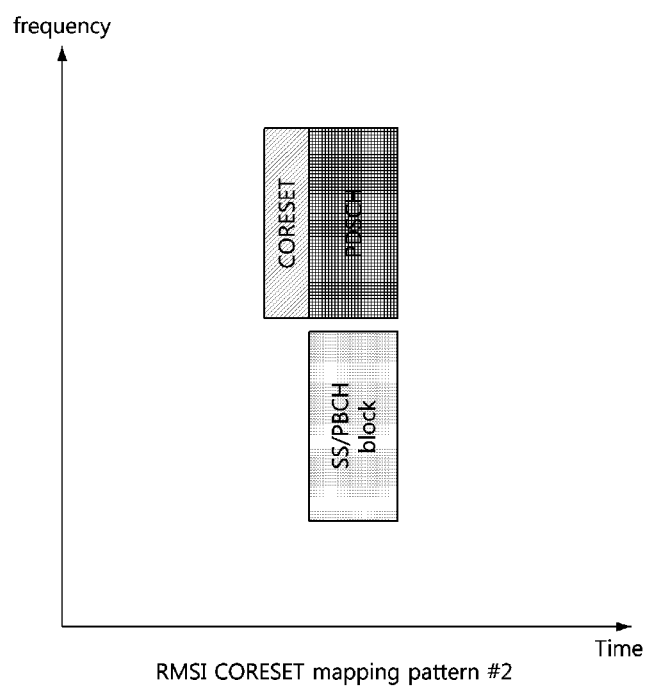
FIG. 9B is a conceptual diagram illustrating an RMSI CORESET mapping pattern #2 in a communication system.
Figure 9C:
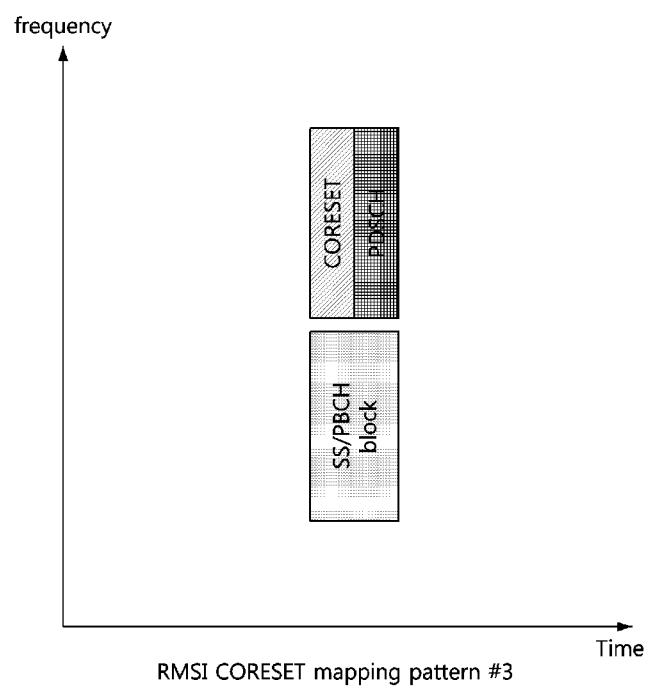
FIG. 9C is a conceptual diagram illustrating an RMSI CORESET mapping pattern #3 in a communication system.

FIG. 9A is a conceptual diagram illustrating an RMSI CORESET mapping pattern #1 in a communication system, FIG. 9B is a conceptual diagram illustrating an RMSI CORESET mapping pattern #2 in a communication system, and FIG. 9C is a conceptual diagram illustrating an RMSI CORESET mapping pattern #3 in a communication system.

As shown in FIGS. 9A to 9C, one RMSI CORESET mapping pattern among the RMSI CORESET mapping patterns #1 to #3 may be used, and a detailed configuration according to the one RMSI CORESET mapping pattern may be determined. In the RMSI CORESET mapping pattern #1, the SS/PBCH block, the CORESET (i.e., RMSI CORESET), and the PDSCH (i.e., RMSI PDSCH) may be configured in a TDM scheme. The RMSI PDSCH may mean the PDSCH through which the RMSI is transmitted. In the RMSI CORESET mapping pattern #2, the CORESET (i.e., RMSI CORESET) and the PDSCH (i.e., RMSI PDSCH) may be configured in a TDM scheme, and the PDSCH (i.e., RMSI PDSCH) and the SS/PBCH block may be configured in a frequency division multiplexing (FDM) scheme. In the RMSI CORESET mapping pattern #3, the CORESET (i.e., RMSI CORESET) and the PDSCH (i.e., RMSI PDSCH) may be configured in a TDM scheme, and the CORESET (i.e., RMSI CORESET) and the PDSCH (i.e., RMSI PDSCH) may be multiplexed with the SS/PBCH block in a FDM scheme.

In the frequency band of 6 GHz or below, only the RMSI CORESET mapping pattern #1 may be used. In the frequency band of 6 GHz or above, all of the RMSI CORESET mapping patterns #1, #2, and #3 may be used. The numerology of the SS/PBCH block may be different from that of the RMSI CORESET and the RMSI PDSCH. Here, the numerology may be a subcarrier spacing. In the RMSI CORESET mapping pattern #1, a combination of all numerologies may be used. In the RMSI CORESET mapping pattern #2, a combination of numerologies (120 kHz, 60 kHz) or (240 kHz, 120 kHz) may be used for the SS/PBCH block and the RMSI CORESET/PDSCH. In the RMSI CORESET mapping pattern #3, a combination of numerologies (120 kHz, 120 kHz) may be used for the SS/PBCH block and the RMSI CORESET/PDSCH.

One RMSI CORESET mapping pattern may be selected from the RMSI CORESET mapping patterns #1 to #3 according to the combination of the numerology of the SS/PBCH block and the numerology of the RMSI CORESET/PDSCH. The configuration information of the RMSI CORESET may include Table A and Table B. Table A may represent the number of resource blocks (RBs) of the RMSI CORESET, the number of symbols of the RMSI CORESET, and an offset between an RB (e.g., starting RB or ending RB) of the SS/PBCH block and an RB (e.g., starting RB or ending RB) of the RMSI CORESET. Table B may represent the number of search space sets per slot, an offset of the RMSI CORESET, and an OFDM symbol index in each of the RMSI CORESET mapping patterns. Table B may represent information for configuring a monitoring occasion of the RMSI PDCCH. Each of Table A and Table B may be composed of a plurality of sub-tables. For example, Table A may include sub-tables 13-1 to 13-8 defined in the technical specification (TS) 38.213, and Table B may include sub-tables 13-9 to 13-13 defined in the TS 38.213. The size of each of Table A and Table B may be 4 bits.

Meanwhile, NR vehicle-to-everything (V2X) communication technology is being discussed in the NR standardization meeting. The NR V2X communication technology may be a technology that supports communication between vehicles, communication between a vehicle and a infrastructure, communication between a vehicle and a pedestrian, and the like based on device-to-device (D2D) communication technologies.

The NR V2X communication (e.g., sidelink communication) may be performed according to three transmission schemes (e.g., unicast scheme, broadcast scheme, groupcast scheme). When the unicast scheme is used, the first terminal may transmit data (e.g., sidelink data) to the second terminal. When the broadcast scheme is used, the first terminal may transmit data to all terminals. When the groupcast scheme is used, the first terminal may transmit data to a group (e.g., groupcast group) composed of a plurality of terminals.

When the unicast scheme is used, the second terminal may transmit feedback information (e.g., acknowledgment (ACK) or negative ACK (NACK)) to the first terminal in response to data received from the first terminal. In the exemplary embodiments below, the feedback information may be referred to as a 'feedback signal', a 'physical sidelink feedback channel (PSFCH) signal', or the like. When ACK is received from the second terminal, the first terminal may determine that the data has been successfully received at the second terminal. When NACK is received from the second terminal, the first terminal may determine that the second terminal has failed to receive the data. In this case, the first terminal may transmit additional information to the second terminal based on an HARQ scheme. Alternatively, the first terminal may improve a reception probability of the data at the second terminal by retransmitting the same data to the second terminal.

When the broadcast scheme is used, a procedure for transmitting feedback information for data may not be performed. For example, system information may be transmitted in the broadcast scheme, and the terminal may not transmit feedback information for the system information to the base station. Therefore, the base station may not identify whether the system information has been successfully received at the terminal. To solve this problem, the base station may periodically broadcast the system information.

When the groupcast scheme is used, a procedure for transmitting feedback information for data may not be performed. For example, necessary information may be periodically transmitted in the groupcast scheme, without the procedure for transmitting feedback information. However, when the candidates of terminals participating in the groupcast scheme-based communication and/or the number of the terminals participating in that is limited, and the data transmitted in the groupcast scheme is data that should be received within a preconfigured time (e.g., data sensitive to delay), it may be necessary to transmit feedback information also in the groupcast sidelink communication. The groupcast sidelink communication may mean sidelink communication performed in the groupcast scheme. When the feedback information transmission procedure is performed in the groupcast sidelink communication, data can be transmitted and received efficiently and reliably.

In addition, data reliability at the receiving terminal may be improved by appropriately adjusting a transmit power of the transmitting terminal according to a transmission environment. Interference to other terminals may be mitigated by appropriately adjusting the transmit power of the transmitting terminal. Energy efficiency can be improved by reducing unnecessary transmit power. A power control scheme may be classified into an open-loop power control scheme and a closed-loop power control scheme. In the open-loop power control scheme, the transmitting terminal may determine the transmit power in consideration of configuration, a measured environment, etc. In the closed-loop power control scheme, the transmitting terminal may determine the transmit power based on a transmit power control (TPC) command received from the receiving terminal.

It may be difficult due to various causes including a multipath fading channel, interference, and the like to predict a received signal strength at the receiving terminal. Accordingly, the receiving terminal may adjust a receive power level (e.g., receive power range) by performing an automatic gain control (AGC) operation to prevent a quantization error of the received signal and maintain a proper receive power. In the communication system, the terminal may perform the AGC operation using a reference signal received from the base station. However, in the sidelink communication (e.g., V2X communication), the reference signal may not be transmitted from the base station. That is, in the sidelink communication, communication between terminals may be performed without the base station. Therefore, it may be difficult to perform the AGC operation in the sidelink communication. In the sidelink communication, the transmitting terminal may first transmit a signal (e.g., reference signal) to the receiving terminal before transmitting data, and the receiving terminal may adjust a receive power range (e.g., receive power level) by performing an AGC operation based on the signal received from the transmitting terminal. Thereafter, the transmitting terminal may transmit sidelink data to the receiving terminal. The signal used for the AGC operation may be a signal duplicated from a signal to be transmitted later or a signal preconfigured between the terminals.

[Feedback Channel Design Method]

In the NR system, sidelink communication (e.g., V2X communication) may be performed in the unicast scheme or groupcast scheme. In this case, the receiving terminal may transmit feedback information (e.g., ACK or NACK) in a preconfigured scheme according to whether data has been successfully received. The feedback information may be transmitted on a specific channel (e.g., PSFCH). In addition, a signal for the AGC operation at the receiving terminal may be additionally transmitted in the sidelink communication. The signal for the AGC operation may be transmitted before the feedback information is transmitted. In the exemplary embodiments below, design methods of a feedback channel (e.g., PSFCH) suitable for transmitting the feedback information in the unicast sidelink communication or the groupcast sidelink communication will be described. The unicast sidelink communication may mean sidelink communication performed in the unicast scheme.

The receiving terminal may perform the AGC operation to adjust a receive power range (e.g., receive power level). The signal for the AGC operation (e.g., reference signal) may be transmitted before transmission of data (e.g., sidelink data). The receiving terminal may receive the signal from the transmitting terminal, and perform a data receiving operation according to an appropriate receive power level through the AGC operation based on the received signal.

A time period required for the ACG operation may be 15 μs. When a subcarrier spacing of 15 kHz is used in the NR system, a time period (e.g., length) of one symbol (e.g., OFDM symbol) may be 66.7 μs. When a subcarrier spacing of 30 kHz is used in the NR system, a time period of one symbol (e.g., OFDM symbol) may be 33.3 μs. In the following exemplary embodiments, a symbol may mean an OFDM symbol. That is, a time period of one symbol may be twice or more than a time period required for the ACG operation. Therefore, using an entire symbol for the ACG operation may cause waste of radio resources. To solve this problem, a portion of a symbol may be used as the time period for the ACG operation, and the remaining time period of the symbol may be used as a time period for transmission of feedback information.

When a comb-type mapping scheme is used, a signal (e.g., sequence) may be alternately mapped in units of one or more subcarriers in the frequency domain within one symbol. In this case, the same signal may be repeated in the time domain after performing an inverse fast Fourier transform (IFFT) operation. According to exemplary embodiments of the present disclosure, feedback information (e.g., feedback signal) may be mapped to the frequency domain based on the comb-type mapping scheme. A front region of a pattern of the feedback information repeated in the time domain may be used as the time period for the AGC operation, and the remaining region (e.g., rear region) may be used for the time period for transmission and reception of the feedback information.

Figure 10:
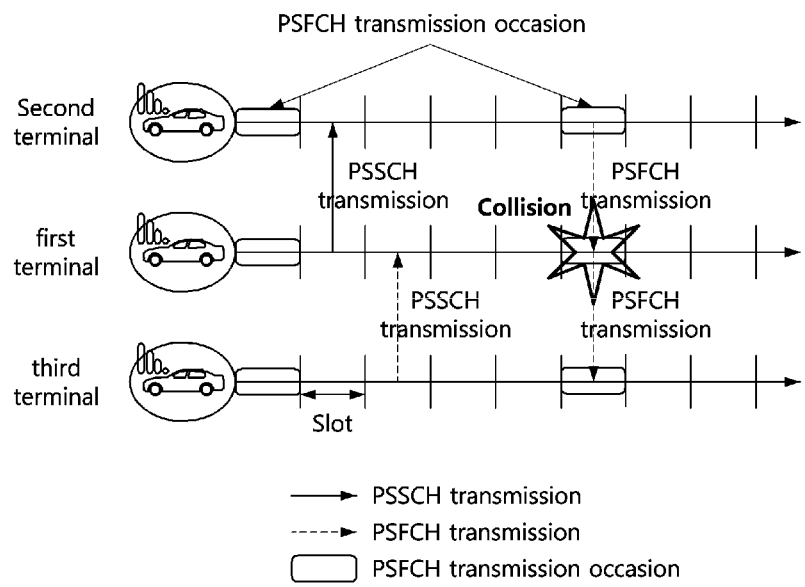
FIG. 10 is a conceptual diagram illustrating a first exemplary embodiment of a method of transmitting ACK/NACK on a PSFCH.

FIG. 10 is a conceptual diagram illustrating a first exemplary embodiment of a method of transmitting ACK/NACK on a PSFCH.

As shown in FIG. 10, a communication network may include a plurality of terminals (e.g., first terminal, second terminal, and third terminal) performing sidelink communication. Each of the plurality of terminals may transmit or receive a signal including sidelink data, and transmit or receive a signal including sidelink feedback information for the sidelink data. Sidelink resources allocated to the terminals may be allocated by a sidelink transmitting terminal or may be allocated by a base station.

In the sidelink communication network including the plurality of terminals (e.g., first terminal, second terminal, and third terminal), the first terminal may transmit sidelink data to the second terminal, and receive sidelink data from the third terminal. The first terminal may receive sidelink feedback information for the sidelink data transmitted to the second terminal, and may transmit sidelink feedback information for the sidelink data received from the third terminal.

A time when the first terminal receives the sidelink feedback information from the second terminal and a time when the first terminal transmits the sidelink feedback information to the third terminal may overlap each other. The terminal may simultaneously perform sidelink feedback information transmission and sidelink feedback information reception. However, in general, the first terminal may not be able to simultaneously perform sidelink feedback information transmission and sidelink feedback information reception in the same frequency band.

According to an exemplary embodiment of the present disclosure, the first terminal may compare priorities of sidelink feedback information based on importance of the sidelink data transmitted to the second terminal and the importance of the sidelink data received from the third terminal. Sidelink data may be classified into important sidelink data that should be transmitted within a preconfigured time limit and sidelink data having relatively low importance. The importance of the sidelink data may be classified according to a priority class. The importance of the sidelink data may be configured by a specific parameter of a higher layer or a specific parameter of a physical layer, or by a combination of parameters of one or more layers. For example, the importance of the sidelink data may be configured based on a sidelink control channel. More specifically, the importance may be configured through first stage control information. Accordingly, the first terminal may determine whether to transmit and/or receive sidelink feedback information based on the importance of the sidelink data.

For example, when the importance of the sidelink data transmitted to the second terminal is higher than the importance of the sidelink data received from the third terminal, the first terminal may drop transmission of feedback information to the third terminal (i.e., drop HARQ transmission). The first terminal dropping the transmission of the feedback information to the third terminal may perform a monitoring operation for receiving sidelink feedback information from the second terminal. As a result of the monitoring operation, the first terminal may receive a signal including the sidelink feedback information from the second terminal.

When the importance of the sidelink data received from the third terminal is higher than the importance of the sidelink data transmitted to the second terminal, the first terminal may drop reception of feedback information from the second terminal (i.e., drop HARQ monitoring). The first terminal dropping the reception of the feedback information from the second terminal may transmit a signal including sidelink feedback information to the third terminal. When it is difficult to simultaneously perform feedback information transmission and feedback information reception, the first terminal may determine the priority of the sidelink feedback information according to the importance of each sidelink data. In addition, the first terminal may transmit and/or receive the sidelink feedback information having a higher priority.

According to another exemplary embodiment of the present disclosure, the first terminal may compare the priorities of the sidelink feedback information based on the type of sidelink feedback for the sidelink data transmitted to the second terminal and the type of sidelink feedback for the sidelink data received from the third terminal.

The first terminal may demodulate the signal from the third terminal to determine whether or not reception of the sidelink data is successful. When the first terminal has successfully received the sidelink data, the first terminal may transmit ACK sidelink feedback information to the third terminal. The third terminal may identify whether the first terminal has successfully received the data, and the third terminal that has received the ACK sidelink feedback information may not retransmit the sidelink data. On the other hand, when the first terminal that has successfully received the sidelink data does not transmit ACK sidelink feedback information to the third terminal, the third terminal may not be able to determine whether or not the first terminal has successfully received the data. Accordingly, the third terminal may determine that a communication state with the first terminal is a discontinuous transmission (DTX) state despite the data reception success at the first terminal, and may retransmit the sidelink data to the first terminal.

When the first terminal has not successfully received the sidelink data, the first terminal may transmit NACK sidelink feedback information to the third terminal. The third terminal may identify that the first terminal has failed to receive the sidelink data, and may retransmit the sidelink data. On the other hand, when the first terminal that has not received the sidelink data does not transmit NACK sidelink feedback information to the third terminal, the third terminal may determine that a communication state with the first terminal is a DTX state, and may retransmit the sidelink data.

Accordingly, when the first terminal that has not received the sidelink data does not transmit NACK sidelink feedback, the third terminal may retransmit the sidelink data, thereby increasing the transmission probability of the sidelink data. On the other hand, when the first terminal that has received the sidelink data does not transmit ACK sidelink feedback, the third terminal may perform an unnecessary sidelink data retransmission operation.

Therefore, according to another exemplary embodiment of the present disclosure, the first terminal may determine that the priority of the ACK sidelink feedback information is higher than the NACK sidelink feedback information. In addition, the first terminal may determine whether to transmit and/or receive sidelink feedback information based on the type (i.e., ACK or NACK) of the sidelink feedback information.

For example, when the sidelink data has been successfully received from the third terminal, the first terminal may transmit ACK sidelink feedback. The first terminal transmitting the ACK sidelink feedback may drop reception of sidelink feedback information from the second terminal (i.e., drop HARQ monitoring) at the time of transmitting the ACK sidelink feedback. The first terminal may not determine whether the second terminal has received the sidelink data, and accordingly, the first terminal may retransmit the sidelink data.

When the sidelink data has not been received from the third terminal, the first terminal may drop transmission of feedback information to the third terminal. The first terminal dropping the transmission of the feedback information to the third terminal may perform a monitoring operation to receive sidelink feedback information from the second terminal. As a result of the monitoring operation, the first terminal may receive a signal including sidelink feedback information from the second terminal.

When it is difficult to simultaneously perform feedback information transmission and feedback information reception at the same time, the first terminal may determine the priorities of the sidelink feedback information according to the types of the sidelink feedback information. In addition, the first terminal may transmit and/or receive the sidelink feedback information having a higher priority.

According to yet another exemplary embodiment of the present disclosure, the first terminal may compare the priorities of the sidelink feedback information based on transmission schemes (e.g., groupcast scheme, unicast scheme, etc.) of the sidelink data transmitted to the second terminal and the sidelink data received from the third terminal. For example, a priority of feedback information for sidelink data transmitted by the groupcast scheme may be higher than a priority of feedback information for sidelink data transmitted by the unicast scheme. The first terminal may determine whether to transmit and/or receive the sidelink feedback information based on transmission scheme information of the sidelink data.

When the transmission scheme of the sidelink data transmitted to the second terminal is the groupcast scheme, and the transmission scheme of the sidelink data received from the third terminal is the unicast scheme, the first terminal may drop transmission of feedback information to the third terminal (i.e., drop HARQ transmission). The first terminal dropping the transmission of feedback information to the third terminal may perform a monitoring operation for receiving sidelink feedback information from the second terminal. As a result of the monitoring operation, the first terminal may receive a signal including the sidelink feedback information from the second terminal.

When the transmission scheme of the sidelink data transmitted to the second terminal is the unicast scheme, and the transmission scheme of the sidelink data received from the third terminal is the groupcast scheme, the first terminal may drop reception of feedback information from the second terminal (i.e., drop HARQ monitoring). The first terminal dropping the reception of feedback information from the second terminal may transmit a signal including sidelink feedback information to the third terminal.

According to yet another exemplary embodiment of the present disclosure, the first terminal may compare the priorities of the sidelink feedback information based on quality of services (QoS) of the sidelink data transmitted to the second terminal and the sidelink data received from the third terminal. Accordingly, the first terminal may determine whether to transmit and/or receive sidelink feedback information based on the QoS of the sidelink data.

For example, when the QoS of the sidelink data transmitted to the second terminal is higher than the QoS of the sidelink data received from the third terminal, the first terminal may drop transmission of feedback information to the third terminal (i.e., drop HARQ transmission). The first terminal dropping the transmission of feedback information to the third terminal may perform a monitoring operation for receiving sidelink feedback information from the second terminal. As a result of the monitoring operation, the first terminal may receive a signal including the sidelink feedback information from the second terminal.

When the QoS of the sidelink data received from the third terminal is higher than the QoS of the sidelink data transmitted to the second terminal, the first terminal may drop reception of feedback information from the second terminal (i.e., drop HARQ monitoring). The first terminal dropping the reception of feedback information from the second terminal may transmit a signal including sidelink feedback information to the third terminal. When it is difficult to simultaneously perform feedback information transmission and feedback information reception at the same time, the first terminal may determine the priority of the sidelink feedback information according to the QoS of each sidelink data. In addition, the first terminal may transmit and/or receive sidelink feedback information having a higher priority.

According to yet another exemplary embodiment of the present disclosure, the first terminal may compare the priorities of the sidelink feedback information based on whether each of the sidelink data transmitted to the second terminal and the sidelink data received from the third terminal is retransmission data or initial transmission data. Accordingly, the first terminal may determine whether to transmit and/or receive sidelink feedback information based on whether the corresponding sidelink data is retransmission data or initial transmission data.

For example, when the sidelink data transmitted to the second terminal is initial transmission data, and the sidelink data received from the third terminal is retransmission data, the first terminal drop transmission of feedback information to the third terminal (i.e., drop HARQ transmission). The first terminal dropping the transmission of feedback information to the third terminal may perform a monitoring operation for receiving sidelink feedback information from the second terminal. As a result of the monitoring operation, the first terminal may receive a signal including sidelink feedback information from the second terminal.

When the sidelink data received from the third terminal is initial transmission data, and the sidelink data transmitted to the second terminal is retransmission data, the first terminal may drop reception of feedback information from the second terminal (i.e., drop HARQ monitoring). The first terminal dropping the reception of feedback information from the second terminal may transmit a signal including sidelink feedback information to the third terminal. When it is difficult to simultaneously perform feedback information transmission and feedback information reception at the same time, the first terminal may determine the priorities of the sidelink feedback information according to whether each of the corresponding sidelink data is initial transmission data or retransmission data. In addition, the first terminal may transmit and/or receive sidelink feedback information having a higher priority.

When the first terminal determines the priorities of the sidelink feedback information by applying a specific criterion, the priorities of different sidelink feedback information may be the same. Therefore, according to an exemplary embodiment of the present disclosure, the first terminal may sequentially apply criteria for determining the priorities of the sidelink feedback information. That is, the first terminal may determine the priorities of the sidelink feedback information by applying a plurality of criteria. For example, the first terminal may preferentially determine the priorities of the sidelink feedback information based on the importance information of the corresponding sidelink data. When the priorities of the sidelink feedback information determined based on the importance information of the corresponding sidelink data are the same, the first terminal may determine the priorities of the sidelink feedback information based on the types of the sidelink feedback information. Although only the determination criteria according to the sidelink data importance and the types of the feedback information are mentioned, it may be apparent that other criteria described in the present disclosure and criteria that can be easily derived from the viewpoint of a person skilled in the art can be combined.

The first terminal may determine the priorities of the sidelink feedback information based on the transmission scheme information of the corresponding sidelink data, as a criterion other than the importance of the sidelink data and the type information of the feedback information. In addition, the first terminal may determine the priorities of the sidelink feedback information additionally based on the sizes of the corresponding sidelink data and channel state information with other terminals.

Each of the plurality of terminals included in the communication network may transmit and receive a signal including a plurality of sidelink data units, and transmit and receive a signal including a plurality of sidelink feedback information for the plurality of sidelink data units.

According to an exemplary embodiment of the present disclosure, the first terminal may compare priorities of sidelink feedback information based on importance of a plurality of sidelink data units transmitted to the second terminal and importance of a plurality of sidelink data units received from the third terminal. Specifically, the first terminal may compare the priorities of the sidelink feedback information based on importance of one of the plurality of sidelink data units transmitted to the second terminal and importance of one of the plurality of sidelink data units received from the third terminal. For example, the first terminal may compare the importance of the sidelink data unit having the highest importance among the plurality of sidelink data units transmitted to the second terminal and the importance of the sidelink data unit having the highest importance among the plurality of sidelink data units received from the third terminal. Accordingly, the first terminal may determine whether to transmit and/or receive sidelink feedback information based on the importance of the plurality of sidelink data units.

For example, when the importance of the sidelink data unit having the highest importance among the plurality of sidelink data units transmitted to the second terminal is higher than the importance of the sidelink data unit having the highest importance among the plurality of sidelink data units received from the third terminal, the first terminal may drop transmission of feedback information to the third terminal (i.e., drop HARQ transmission). The first terminal dropping the transmission of the feedback information to the third terminal may perform a monitoring operation for receiving sidelink feedback information from the second terminal. As a result of the monitoring operation, the first terminal may receive a signal including the sidelink feedback information from the second terminal.

When the importance of the sidelink data unit having the highest importance among the plurality of sidelink data units received from the third terminal is higher than the importance of the sidelink data units having the highest importance among the plurality of sidelink data units transmitted to the second terminal, the first terminal may drop reception of feedback information from the second terminal (i.e., drop HARQ monitoring). The first terminal dropping reception of feedback information from the second terminal may transmit a signal including sidelink feedback information to the third terminal. When it is difficult to simultaneously perform feedback information transmission and feedback information reception at the same time, the first terminal may determine the priorities of the sidelink feedback information according to the importance of the plurality of sidelink data units. In addition, the first terminal may transmit and/or receive sidelink feedback information having a higher priority.

According to yet another exemplary embodiment of the present disclosure, the first terminal may sequentially compare priorities of the transmitted sidelink data units and priorities of the received sidelink data units. First, the first terminal may compare a priority of the sidelink data unit having the highest importance among the transmitted sidelink data units and a priority of the sidelink data unit having the highest importance among the received sidelink data units.

However, the importance of the sidelink data unit having the highest importance among the transmitted sidelink data units and the importance of the sidelink data unit having the highest importance among the received sidelink data units may be the same. As a result of comparing the priorities of the sidelink data units, when the priorities of the sidelink data units having the highest importance is the same, the first terminal may compare the importance of the sidelink data unit having the second highest importance among the plurality of sidelink data units transmitted to the second terminal and the sidelink data unit having the second highest importance among the plurality of sidelink data units received from the third terminal. Accordingly, the first terminal may determine whether to transmit and/or receive sidelink feedback information based on the importance of the plurality of sidelink data units.

The first terminal transmitting a plurality of sidelink feedback information may transmit at least a portion among the sidelink feedback information according to the maximum allowable number of simultaneous sidelink feedback transmissions. For example, when the maximum allowable number of simultaneous sidelink feedback transmissions of the first terminal desiring to transmit M sidelink feedback information is K (e.g., K is an integer less than or equal to M), the first terminal may select K sidelink feedback information among the M sidelink feedback information, and transmit the K sidelink feedback information simultaneously.

The first terminal may allocate the same transmit power to each of the selected K sidelink feedback information. Alternatively, the first terminal may allocate a different transmit power to each of the sidelink feedback information according to the priority of each of the sidelink feedback information.

The first terminal transmitting a plurality of sidelink feedback information may transmit at least a portion of the plurality of sidelink feedback information according to a transmit power situation. For example, the first terminal desiring to transmit M sidelink feedback information may select N sidelink feedback information (e.g., N is an integer equal to or less than M) according to a situation of transmit powers of the sidelink feedback information, which are allocated based on the priorities of the sidelink data units, and transmit the selected K sidelink feedback information simultaneously.

The first terminal may allocate the same transmit power to each of the selected N sidelink feedback information according to the priority of each of the sidelink feedback information. Alternatively, the first terminal may differentially allocate a transmit power to each of the selected N sidelink feedback information according to the priority of each of the sidelink feedback information.

The first terminal transmitting a plurality of sidelink feedback information may transmit the sidelink feedback information in consideration of both the maximum allowable number of simultaneous sidelink feedback transmissions and the transmit power situation. Specifically, the first terminal may transmit at least a portion of the sidelink feedback information by sequentially applying the maximum allowable number of simultaneous sidelink feedback transmissions and the transmit power situation.

The first terminal may preferentially consider the maximum allowable number of simultaneous sidelink feedback transmissions to select a portion of the plurality of sidelink feedback information according to the priorities. In addition, if necessary, the first terminal may select and transmit a portion of the selected feedback information based on the priority of each of the sidelink feedback information according to the transmit power situation.

For example, in a situation in which the number of sidelink feedbacks to be transmitted by the first terminal is M and the maximum allowable number of simultaneous sidelink feedback transmissions is K, when the first terminal may select M sidelink feedback information. In addition, when the transmit power is insufficient in consideration of the transmit power, the first terminal may select N (e.g., N is an integer equal to or less than M) sidelink feedback information among the M sidelink feedback information according to priorities thereof, and transmit the selected N sidelink feedback information simultaneously. On the other hand, if the transmit power is sufficient, the first terminal may simultaneously transmit the M sidelink feedback information.

In a situation in which the number of sidelink feedbacks to be transmitted by the first terminal is M and the maximum allowable number of simultaneous sidelink feedback transmissions of the first terminal is K, when M>K, the first terminal may select K sidelink feedback information among M sidelink feedback information according to priorities thereof. In addition, when the transmit power is insufficient in consideration of the transmit power, the first terminal may select N (e.g., N is an integer equal to or less than K) sidelink feedback information among the selected K sidelink feedback information according to priorities thereof, and transmit them simultaneously. On the other hand, when the transmit power is sufficient, the first terminal may simultaneously transmit the K sidelink feedback information.

The first terminal receiving a plurality of sidelink feedback information may receive at least a portion of the sidelink feedback information. That is, the first terminal scheduled to receive M sidelink feedback information may monitor only N or K (≤M) sidelink feedback information according to priorities thereof.

Figure 11:
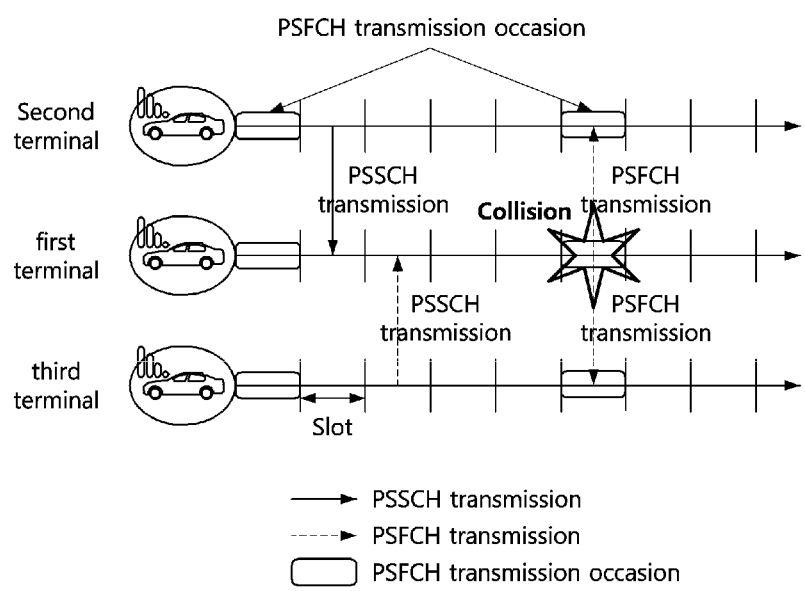
FIG. 11 is a conceptual diagram illustrating a second exemplary embodiment of a method of transmitting ACK/NACK on a PSFCH.

FIG. 11 is a conceptual diagram illustrating a second exemplary embodiment of a method of transmitting ACK/NACK on a PSFCH.

As shown in FIG. 11, in a sidelink communication network including a plurality of terminals (e.g., first terminal, second terminal, and third terminal), the first terminal may receive sidelink data from the second terminal, and receive sidelink data from the third terminal. The first terminal may transmit sidelink feedback information for the sidelink data received from the second terminal, and may transmit sidelink feedback information for the sidelink data received from the third terminal.

A time when the first terminal transmits the sidelink feedback information to the second terminal and a time when the first terminal transmits the sidelink feedback information to the third terminal may overlap each other. As shown and described in FIG. 10 and the explanation of FIG. 10, the first terminal may determine priorities of the sidelink feedback information, and transmit the sidelink feedback information based on the determined priorities. For example, the first terminal may transmit only sidelink feedback information having the highest priority among the sidelink feedback information to be transmitted.

According to another exemplary embodiment of the present disclosure, the first terminal may transmit a plurality of sidelink feedback information at the same time by dividing transmission resources to be allocated to the plurality of sidelink feedback information. For example, the plurality of sidelink feedback information may be transmitted through different transmission resources (e.g., time resources (e.g., OFDM symbols, etc.), frequency resources, codes, etc. that are further subdivided within the same time point). However, a transmit power of the first terminal may be limited, and the first terminal may differentially allocate a transmit power to each sidelink feedback information.

For example, the first terminal that transmits a plurality of sidelink feedback information to different terminals at a specific time may preferentially allocate a transmit power to sidelink feedback information having the highest priority based on priorities of the plurality of sidelink feedback information. The first terminal may determine the priorities of the sidelink feedback information based on the importance of the sidelink data, the types of the sidelink feedback information, the QoS and/or size of the sidelink data, and/or the like. Further, the first terminal may determine the priorities of the sidelink feedback information by sequentially applying the criteria for determining the priorities of the sidelink feedback information.

The first terminal may allocate the same transmit power to each of N sidelink feedback information. Alternatively, the first terminal may differentially allocate a transmit power to each of the sidelink feedback information according to the priority of each of the sidelink feedback information.

More specifically, when the first terminal needs to transmit sidelink feedback information to the second terminal and the third terminal, the first terminal may allocate a transmit power to each of the sidelink feedback information by comparing the priorities of the sidelink feedback information to be transmitted to the second terminal and the sidelink feedback information to be transmitted to the third terminal. For example, when the transmit power allocated to the sidelink feedback information to be transmitted to the third terminal is equal to or less than a preconfigured range, the first terminal may not transmit the sidelink feedback information to the third terminal.

That is, the first terminal scheduled to transmit a plurality of sidelink feedback information may transmit at least some of the sidelink feedback information according to a transmit power situation. For example, the first terminal scheduled to transmit M sidelink feedback information may transmit N (e.g., N is an integer equal to or less than M) sidelink feedback information according to a transmit power situation. The value of N may be preconfigured through system information, control information, or the like, or may be configured according to capability of the first terminal.

Figure 12:
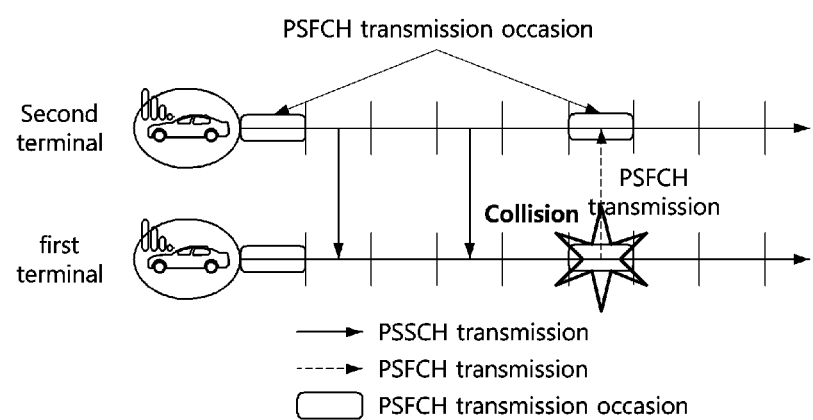
FIG. 12 is a conceptual diagram illustrating a third exemplary embodiment of a method of transmitting ACK/NACK on a PSFCH.

FIG. 12 is a conceptual diagram illustrating a third exemplary embodiment of a method of transmitting ACK/NACK on a PSFCH.

As shown in FIG. 12, in a sidelink communication network including a plurality of terminals (e.g., first terminal and second terminal), the first terminal may receive first sidelink data and second sidelink data from the second terminal. Then, the first terminal may transmit sidelink feedback information (e.g., first sidelink feedback information and second sidelink feedback information) for the sidelink data (e.g., first sidelink data and second sidelink data) received from the second terminal.

A time when the first terminal transmits the first sidelink feedback information for the first sidelink data and a time when the first terminal transmits the second sidelink feedback information for the second sidelink data may overlap each other. As shown and described in FIG. 10 and the explanation of FIG. 10, the first terminal may determine priorities of the sidelink feedback information, and transmit the sidelink feedback information based on the determined priorities. For example, the first terminal may transmit only sidelink feedback information having the highest priority among the sidelink feedback information to be transmitted.

According to another exemplary embodiment of the present disclosure, the first terminal may transmit a plurality of sidelink feedback information (e.g., first sidelink feedback information and second sidelink feedback information) at the same time by dividing transmission resources to be allocated to the plurality of sidelink feedback information. For example, the plurality of sidelink feedback information may be transmitted through different transmission resources (e.g., time resources (e.g., OFDM symbols, etc.), frequency resources, codes, etc. that are further subdivided within the same time point). However, a transmit power of the first terminal may be limited, and the first terminal may differentially allocate a transmit power to each sidelink feedback information.

The first terminal that transmits a plurality of sidelink feedback information (e.g., first sidelink feedback information and second sidelink feedback information) to one terminal (e.g., second terminal) at a specific time may determine the priorities of the sidelink feedback information. For example, the first terminal may determine the priorities of the sidelink feedback information based on the importance of the sidelink data, the types of the sidelink feedback information, the QoS and/or size of the sidelink data, and/or the like. Further, the first terminal may determine the priorities of the sidelink feedback information by sequentially applying the criteria for determining the priorities of the sidelink feedback information. Based on the determined priorities of the sidelink feedback information, the first terminal may preferentially allocate a transmit power to sidelink feedback information having the highest priority.

The first terminal may allocate the same transmit power to each of N sidelink feedback information. Alternatively, the first terminal may differentially allocate a transmit power to each of the sidelink feedback information according to the priority of each of the sidelink feedback information.

More specifically, when the first terminal needs to transmit sidelink feedback information (e.g., first to third sidelink feedback information) to the second terminal, the first terminal may allocate a transmit power to each of the first to third sidelink feedback information by comparing the priorities of the first to third sidelink feedback information. For example, when the transmit power allocated to the third sidelink feedback information among the first to third sidelink feedback information is equal to or less than a preconfigured range, the first terminal may not transmit the third sidelink feedback information.

That is, the first terminal scheduled to transmit a plurality of sidelink feedback information may transmit at least some of the sidelink feedback information according to a transmit power situation. For example, the first terminal scheduled to transmit M sidelink feedback information may transmit N (e.g., N is an integer equal to or less than M) sidelink feedback information according to a transmit power situation. The value of N may be preconfigured through system information, control information, or the like, or may be configured according to capability of the first terminal.

According to another exemplary embodiment of the present disclosure, the first terminal may bundle a plurality of sidelink feedback information to be transmitted to one terminal (e.g., the second terminal). For example, the first terminal may generate one sidelink feedback information by performing an AND operation between the first to third sidelink feedback information to be transmitted to the second terminal. The first terminal may transmit the bundled sidelink feedback information to the second terminal. The bundled sidelink feedback information may be transmitted through a feedback resource having a high priority among feedback resources.

According to yet another exemplary embodiment of the present disclosure, the first terminal may configure one codebook based on a plurality of sidelink feedback information to be transmitted to one terminal (e.g., the second terminal). For example, when the first to third sidelink feedback information are 'ACK', 'NACK', and 'ACK', the first terminal may configure a codebook of '010'. The first terminal may transmit the configured codebook to the second terminal in form of data. Alternatively, the first terminal may select a feedback channel resource and/or sequence capable of indicating the configured codebook, and transmit the selected feedback channel resource and/or sequence to the second terminal.

The sidelink feedback information may be transmitted on a preconfigured channel. More specifically, the sidelink feedback information may be transmitted on a PSFCH. According to the description of the present disclosure, the sidelink communication network may include first to third terminals, but the sidelink feedback information transmission methods according to the present disclosure may be applied also to the sidelink communication network further including additional terminals. In addition, although the method of transmitting sidelink feedback information in a communication network is described according to the description of the present disclosure, it may be applied also to transmission of uplink feedback information and downlink feedback information.

For example, the first terminal may transmit a sidelink feedback signal including sidelink feedback information to the second terminal, and may transmit an uplink signal including sidelink feedback information to the base station. A transmission time of the sidelink feedback signal of the first terminal may be the same as a transmission time of the uplink signal. When the transmission time of the sidelink feedback signal is the same as the transmission time of the uplink signal, the first terminal may determine the priorities of the sidelink signal to be fed back to the second terminal and the uplink signal to be transmitted to the base station.

For example, the first terminal may determine the priorities of the sidelink feedback information based on the importance of sidelink data, the type of sidelink feedback information, the QoS and size of the sidelink data, etc. Further, the first terminal may determine the priorities of the sidelink feedback information by sequentially applying the criteria for determining the priorities of the sidelink feedback information. Based on the priority information of each of the sidelink feedback information, the first terminal may preferentially allocate a transmit power to the sidelink feedback information having the highest priority.

The first terminal that simultaneously transmits the uplink signal and the sidelink signal at a specific time point may preferentially allocate a transmit power to the uplink or sidelink signal having the highest priority based on the priorities of the uplink signal and the sidelink signal. When the priority of the uplink signal is higher than the priority of the sidelink feedback signal, the first terminal may preferentially allocate a transmit power to the uplink signal. As a result of considering a transmit power required for transmission of the sidelink signal, when a sum of the transmit power allocated to the uplink signal and the transmit power allocated to the sidelink feedback signal exceeds a maximum transmit power, the first terminal may transmit the sidelink signal with a reduced power.

When the priority of the sidelink feedback signal is higher, the first terminal may preferentially allocate a transmit power to the sidelink feedback signal. As a result of considering a transmit power required for the transmission of the uplink signal, when a sum of the transmit power allocated to the uplink signal and the transmit power allocated to the sidelink feedback signal exceeds a maximum transmit power, the first terminal may transmit the uplink signal with a reduced power.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a first terminal performing sidelink communication, the operation method comprising:
   receiving at least one sidelink data channel;
   transmitting at least one sidelink data channel;
   when an occasion of feedback for the at least one transmitted sidelink data channel is overlapped with an occasion of feedback for the at least one received sidelink data channel, comparing a priority of the feedback for the at least one transmitted sidelink data channel and a priority of the feedback for the at least one received sidelink data channel; and
   based on the comparing, transmitting or receiving a sidelink feedback channel among sidelink feedback channels for the at least one transmitted sidelink data channel and sidelink feedback channels for the at least one received sidelink data channel in the overlapped occasion.

2. The operation method according to claim 1, wherein the occasion of feedback is a physical sidelink feedback channel (PSFCH) transmission occasion which is configured periodically.

3. The operation method according to claim 1, wherein in the transmitting or receiving of the sidelink feedback channel, a sidelink feedback channel for the at least one received sidelink data channel is transmitted in the overlapped occasion when a priority of sidelink data included in the at least one received sidelink data channel is higher than a priority of sidelink data included in the at least one transmitted sidelink data channel.

4. The operation method according to claim 1, wherein in the transmitting or receiving of the sidelink feedback channel, a sidelink feedback channel for the at least one transmitted sidelink data channel is received in the overlapped occasion when a priority of sidelink data included in the at least one transmitted sidelink data channel is higher than a priority of sidelink data included in the at least one received sidelink data channel.

5. The operation method according to claim 1, wherein the priority of the feedback for the at least one received sidelink data channel or the priority of the feedback for the at least one transmitted sidelink data channel is determined based on at least one of importance, quality of service (QoS), and size of sidelink data included in each of the at least one received sidelink data channel and the at least one transmitted sidelink data channel.

6. The operation method according to claim 1, wherein in the comparing, a highest priority of priorities of the at least one received sidelink data channel is compared with a highest priority of priorities of the at least one transmitted sidelink data channel.

7. The operation method according to claim 1, further comprising, when a plurality of sidelink feedback channels are to be transmitted in the overlapped occasion,
comparing feedback priorities for the plurality of sidelink feedback channels; and
based on a result of comparing the feedback priorities, transmitting one or more sidelink feedback channels among the plurality of sidelink feedback channels in the overlapped occasion.

8. The operation method according to claim 7, wherein a number of the one or more sidelink feedback channels and a transmit power allocated to feedback information for each of the one or more sidelink feedback channels are determined based on a maximum transmit power of the first terminal.

9. The operation method according to claim 8, wherein the number of the one or more sidelink feedback channels is determined such that a sum of transmit powers allocated to the one or more sidelink feedback channels is equal to or smaller than the maximum transmit power of the first terminal.

10. The operation method according to claim 8, wherein when a number of sidelink feedback channels for a plurality of received sidelink data channels is greater than a preconfigured number, the number of the one or more sidelink feedback channels is determined to be equal to or smaller than the preconfigured number, and a sum of transmit powers of the one or more sidelink feedback channels is determined to be equal to or smaller than the maximum transmit power of the first terminal.

11. The operation method according to claim 7, further comprising, when the transmission of the one or more sidelink feedback channels overlaps uplink transmission of the first terminal,
decreasing transmit powers allocated to the one or more sidelink feedback channels when a priority of the uplink transmission is higher than a priority of the transmission of the one or more sidelink feedback channels; and
increasing the transmit powers allocated to the one or more sidelink feedback channels when the priority of the transmission of the one or more sidelink feedback channels is higher than the priority of the uplink transmission.

12. A first terminal for performing sidelink communication, the first terminal comprising:
a processor; and
a memory storing at least one instruction executable by the processor,
wherein when executed by the processor, the at least one instruction causes the first terminal to:
receive at least one sidelink data channel;
transmit at least one sidelink data channel;
when an occasion of feedback for the at least one transmitted sidelink data channel is overlapped with an occasion of feedback for the at least one received sidelink data channel, compare a priority of the feedback for the at least one transmitted sidelink data channel and a priority of the feedback for the at least one received sidelink data channel; and
based on the comparing, transmit or receive a sidelink feedback channel among sidelink feedback channels for the at least one transmitted sidelink data channel and sidelink feedback channels for the at least one received sidelink data channel in the overlapped occasion.

13. The first terminal according to claim 12, in the transmitting or receiving of the sidelink feedback channel, a sidelink feedback channel for the at least one received sidelink data channel is transmitted in the overlapped occasion when a priority of sidelink data included in the at least one received sidelink data channel is higher than a priority of sidelink data included in the at least one transmitted sidelink data channel.

14. The first terminal according to claim 12, wherein in the transmitting or receiving of the sidelink feedback channel, a sidelink feedback channel for the at least one transmitted sidelink data channel is received in the overlapped occasion when a priority of sidelink data included in the at least one transmitted sidelink data channel is higher than a priority of sidelink data included in the at least one received sidelink data channel.

15. The first terminal according to claim 12, wherein in the comparing, a highest priority of priorities of the at least one received sidelink data channel is compared with a highest priority of priorities of the at least one transmitted sidelink data channel.

16. The first terminal according to claim 12, wherein, when the at least one received sidelink channel is plural, the at least one instruction further causes the first terminal to:
compare feedback priorities for the plurality of received sidelink data channels in the overlapped occasion; and
based on a result of comparing the feedback priorities, transmit one or more sidelink feedback channels including feedback information for one or more sidelink data channels among the plurality of received sidelink data channels in the overlapped occasion.

17. The first terminal according to claim 16, wherein a number of the one or more sidelink feedback channels and a transmit power allocated to feedback information for each of the one or more sidelink feedback channels are determined based on a maximum transmit power of the first terminal.

18. The first terminal according to claim 17, wherein the number of the one or more sidelink feedback channels is determined such that a sum of transmit powers allocated to the one or more sidelink feedback channels is equal to or smaller than the maximum transmit power of the first terminal.

19. The first terminal according to claim 17, wherein when a number of sidelink feedback channels for the plurality of received sidelink data channels is greater than a preconfigured number, the number of the one or more sidelink feedback channels is determined to be equal to or smaller than the preconfigured number, and a sum of transmit powers of the one or more sidelink feedback channels is determined to be equal to or smaller than the maximum transmit power of the first terminal.

20. An operation method of a first terminal performing sidelink communication, the operation method comprising:

receiving a sidelink data channel from a second terminal;
transmitting a sidelink data channel to a third terminal;
when an occasion of feedback for the transmitted sidelink data channel is overlapped with an occasion of feedback for the received sidelink data channel, comparing priority for the transmitted sidelink data channel and priority for the received sidelink data channel;
when the priority for the transmitted sidelink data channel is higher than the priority for the received sidelink data channel, receiving the feedback for the transmitted sidelink data channel from the third terminal; and
when the priority for the received sidelink data channel is higher than the priority for the transmitted sidelink data channel, transmitting the feedback for the received sidelink data channel to the second terminal.

* * * * *